United States Patent
Arling et al.

(10) Patent No.: US 11,985,003 B2
(45) Date of Patent: May 14, 2024

(54) APPARATUS, SYSTEM AND METHOD FOR DIRECTING VOICE INPUT IN A CONTROLLING DEVICE

(71) Applicant: Universal Electronics Inc., Scottsdale, AZ (US)

(72) Inventors: Paul Arling, Scottsdale, AZ (US); Norman G. Sheridan, Fremont, CA (US); Arsham Hatambeiki, Scottsdale, AZ (US); Thomas Henley, Huntington Beach, CA (US); Jon Gallegos, Huntington Beach, CA (US)

(73) Assignee: Universal Electronics Inc., Scottsdale, AZ (US)

( * ) Notice: Subject to any disclaimer, the term of this patent is extended or adjusted under 35 U.S.C. 154(b) by 0 days.

(21) Appl. No.: 17/752,541

(22) Filed: May 24, 2022

(65) Prior Publication Data

US 2022/0286317 A1     Sep. 8, 2022

Related U.S. Application Data

(63) Continuation of application No. 15/647,947, filed on Jul. 12, 2017, now Pat. No. 11,489,691.

(51) Int. Cl.
| | |
|---|---|
| *G09G 5/00* | (2006.01) |
| *G06F 3/16* | (2006.01) |
| *G08C 17/02* | (2006.01) |
| *G10L 15/22* | (2006.01) |
| *H04L 12/28* | (2006.01) |

(52) U.S. Cl.
CPC ............ *H04L 12/282* (2013.01); *G06F 3/167* (2013.01); *G08C 17/02* (2013.01); *G10L 15/22* (2013.01); *G08C 2201/31* (2013.01); *G08C 2201/40* (2013.01); *G08C 2201/92* (2013.01); *G10L 2015/223* (2013.01)

(58) Field of Classification Search
CPC ....... H04L 12/282; G06F 3/167; G08C 17/02; G08C 2201/31; G08C 2201/40; G08C 2201/92; G10L 15/22; G10L 2015/223
USPC ........................................................ 345/169
See application file for complete search history.

(56) References Cited

U.S. PATENT DOCUMENTS

| | | |
|---|---|---|
| 2,503,391 A | 4/1950 | Kannenberg |
| 2,564,437 A | 8/1951 | Kannenberg |

(Continued)

FOREIGN PATENT DOCUMENTS

| | | |
|---|---|---|
| EP | 1209661 A1 | 5/2002 |
| EP | 3012836 A1 | 4/2016 |

(Continued)

OTHER PUBLICATIONS

JPO, office action issued on Japanese patent application No. 2020-537000, dated Oct. 18, 2022, 4 pages.

(Continued)

*Primary Examiner* — Jennifer T Nguyen
(74) *Attorney, Agent, or Firm* — Greenberg Traurig, LLP

(57) ABSTRACT

Apparatus, system and method for using a controlling device for receiving voice input to control the operation of voice controlled smart appliances and, more particularly, to a controlling device for recognizing voice commands and for use in routing a signal, based on voice commands from the user, to two or more voice controlled smart appliances from different consumer brand names.

18 Claims, 6 Drawing Sheets

(56) References Cited

U.S. PATENT DOCUMENTS

| | | | |
|---|---|---|---|
| 4,432,096 | A | 2/1984 | Bunge |
| 5,436,896 | A | 7/1995 | Anderson et al. |
| 5,687,285 | A | 11/1997 | Katayanagi et al. |
| 5,778,077 | A | 7/1998 | Davidson |
| 6,125,288 | A | 9/2000 | Imai |
| 6,606,280 | B1 | 8/2003 | Knittel |
| 7,072,833 | B2 | 7/2006 | Rajan |
| 7,080,014 | B2 | 7/2006 | Bush et al. |
| 7,706,553 | B2 | 4/2010 | Brown |
| 7,991,614 | B2 | 8/2011 | Washio et al. |
| 8,068,881 | B2 | 11/2011 | Schrager |
| 8,768,692 | B2 | 7/2014 | Hayakawa |
| 9,251,787 | B1 | 2/2016 | Hart et al. |
| 9,466,286 | B1 | 10/2016 | Hart et al. |
| 9,509,269 | B1 | 11/2016 | Rosenberg |
| 9,516,371 | B2 | 12/2016 | Einarsson |
| 9,596,429 | B2 | 3/2017 | Garcia Navarro |
| 9,711,162 | B2 | 7/2017 | Murthy et al. |
| 9,755,605 | B1 | 9/2017 | Li et al. |
| 9,852,773 | B1 | 12/2017 | Salvador |
| 10,013,999 | B1 | 7/2018 | Fadell et al. |
| 10,073,671 | B2 | 9/2018 | VanBlon et al. |
| 10,084,423 | B1 | 9/2018 | Goldstein et al. |
| 10,091,545 | B1 | 10/2018 | Cwik |
| 10,362,268 | B2 | 7/2019 | Ferrer Zaera |
| 10,461,712 | B1 | 10/2019 | Yang et al. |
| 2002/0044199 | A1 | 4/2002 | Barzebar et al. |
| 2002/0052746 | A1 | 5/2002 | Handelman |
| 2003/0081739 | A1 | 5/2003 | Hikishima |
| 2005/0096753 | A1 | 5/2005 | Arling et al. |
| 2006/0028337 | A1 | 2/2006 | Li |
| 2007/0293270 | A1 | 12/2007 | Montebovi et al. |
| 2009/0299742 | A1 | 12/2009 | Toman et al. |
| 2010/0121636 | A1 | 5/2010 | Burke et al. |
| 2011/0051016 | A1 | 3/2011 | Malode |
| 2012/0116755 | A1 | 5/2012 | Park |
| 2012/0166042 | A1 | 6/2012 | Kokido et al. |
| 2013/0132094 | A1 | 5/2013 | Lim |
| 2013/0183944 | A1* | 7/2013 | Mozer ................. H04L 12/2818 455/414.1 |
| 2013/0302008 | A1 | 11/2013 | Kwon et al. |
| 2014/0140539 | A1 | 5/2014 | Urup |
| 2014/0270194 | A1 | 9/2014 | Des Jardins |
| 2014/0317660 | A1 | 10/2014 | Cheung et al. |
| 2015/0016633 | A1 | 1/2015 | Gao et al. |
| 2015/0185964 | A1 | 7/2015 | Stout |
| 2015/0290808 | A1 | 10/2015 | Renkis |
| 2015/0358730 | A1 | 12/2015 | Kirsch et al. |
| 2016/0044151 | A1 | 2/2016 | Shoemaker et al. |
| 2016/0077794 | A1 | 3/2016 | Kim et al. |
| 2016/0103653 | A1 | 4/2016 | Jang |
| 2016/0111087 | A1 | 4/2016 | Srail |
| 2016/0155443 | A1 | 6/2016 | Khan et al. |
| 2016/0179462 | A1* | 6/2016 | Bjorkengren ........... G10L 15/22 704/275 |
| 2016/0316293 | A1 | 10/2016 | Klimanis |
| 2017/0031420 | A1 | 2/2017 | Wong et al. |
| 2017/0048609 | A1 | 2/2017 | Schnell et al. |
| 2017/0053666 | A1 | 2/2017 | Konjeti et al. |
| 2017/0094215 | A1 | 3/2017 | Western |
| 2017/0126192 | A1 | 5/2017 | Fu et al. |
| 2017/0133011 | A1* | 5/2017 | Chen ..................... G10L 25/78 |
| 2017/0188437 | A1 | 6/2017 | Banta et al. |
| 2017/0256270 | A1 | 9/2017 | Singaraju et al. |
| 2017/0263120 | A1 | 9/2017 | Durie, Jr. et al. |
| 2017/0263268 | A1 | 9/2017 | Rumberg et al. |
| 2017/0264738 | A1 | 9/2017 | Gong et al. |
| 2017/0289486 | A1 | 10/2017 | Stroffolino |
| 2018/0018964 | A1 | 1/2018 | Reilly et al. |
| 2018/0040335 | A1 | 2/2018 | Faller et al. |
| 2018/0061403 | A1 | 3/2018 | Devaraj et al. |
| 2018/0091913 | A1 | 3/2018 | Hartung et al. |
| 2018/0108351 | A1 | 4/2018 | Beckhardt et al. |
| 2018/0124356 | A1 | 5/2018 | Ferrer Zaera et al. |
| 2018/0190258 | A1 | 7/2018 | Mohammad et al. |
| 2018/0211662 | A1 | 7/2018 | Yamaguchi et al. |
| 2018/0233136 | A1 | 8/2018 | Torok et al. |
| 2018/0286431 | A1 | 10/2018 | Cutler et al. |
| 2018/0295443 | A1 | 10/2018 | Takada et al. |
| 2018/0332417 | A1 | 11/2018 | Hartung et al. |
| 2019/0108837 | A1 | 4/2019 | Christoph et al. |
| 2019/0122656 | A1 | 4/2019 | Clark et al. |
| 2019/0198043 | A1 | 6/2019 | Crespi et al. |
| 2019/0295542 | A1 | 9/2019 | Huang et al. |
| 2019/0355365 | A1* | 11/2019 | Kim ....................... G06F 3/167 |

FOREIGN PATENT DOCUMENTS

| | | | |
|---|---|---|---|
| EP | 3 413 303 | A1 | 12/2018 |
| JP | 2003219393 | A | 7/2003 |
| JP | 2012095047 | A | 5/2012 |
| JP | 2014-155007 | A | 8/2014 |
| JP | 2016-213589 | A | 12/2016 |
| JP | 2017 138476 | A | 8/2017 |
| JP | 2017203967 | A | 11/2017 |
| WO | 01/75837 | A2 | 10/2001 |
| WO | 2015/127194 | A1 | 8/2015 |
| WO | 2015/149216 | A1 | 10/2015 |
| WO | 2017/134935 | A1 | 8/2017 |

OTHER PUBLICATIONS

JPO, English translation of office action issued on Japanese patent application No. 2020-537000, dated Oct. 18, 2022, 5 pages.

Antonio Villas-Boas, 14 ways you can control your home with your voice using Amazon's Echo and Alexa, Business Insider (archived Jan. 11, 2017) (accessed Apr. 4, 2022), available at https://web.archive.org/web/20170111152200/ https://www.businessinsider.com/amazon-echo-alexa-control-smart-home-withvoice-2017-1.

Chaim Gartenberg, You can now use your Alexa devices to control your Amazon Fire TV, The Verge (Jul. 12, 2017) (archived Jul. 12, 2017) (accessed Apr. 4, 2022), available at https://web.archive.org/web/20170712204132/ https:/www.theverge.com/2017/7/12/15960222/amazon-fire-tv-alexa-voicecommands-echo-dot-software-update.

Nicole Nguyen, If you have a smart TV, take a closer look at your privacy settings, CNBC (archived Mar. 9, 2017) (accessed Apr. 4, 2022), available at https://web.archive.org/web/20170309220053/ https://www.cnbc.com/2017/03/09/if-you-have-a-smart-tv-take-a-closer-lookat-your-privacy-settings.html.

John Patrick Pullen, The Ultimate Guide to the Amazon Echo, TIME (Feb. 18, 2016) (archived Feb. 21, 2016) (accessed Apr. 4, 2022), available at https://web.archive.org/web/20160221032035/ http://time.com:80/4227833/amazon-echo-user-guide/.

Roberto Pieraccini, From AUDREY to Siri. Is speech recognition a solved problem? (presentation), International Science Institute at Berkeley (archived Jun. 26, 2013) (accessed Apr. 6, 2022), available at https://web.archive.org/web/20130626012955/ https://www1.icsi.berkeley.edu/pubs/speech/audreytosiri12.pdf.

Pioneering Speech Recognition, IBM (accessed Apr. 6, 2022), available at https://www.ibm.com/ibm/history/ibm100/us/en/icons/speechreco/transform/.

B.H. Juang & Lawrence R. Rabiner, Automatic Speech Recognition—A Brief History of the Technology Development (archived May 27, 2016) (accessed Apr. 6, 2022), available at https://web.archive.org/web/20160527115003/ https:/web.ece.ucsb.edu/Faculty/Rabiner/ece259/Reprints/354_LALIASRHistory-final-10-8.pdf.

History of Speech & Voice Recognition and Transcription Software, Dragon Naturally Speaking (archived Mar. 19, 2005) (accessed Apr. 6, 2022), available at https://web.archive.org/web/20050319025603/ http:/www.dragon-medicaltranscription.com/history_speech_recognition.html.

U.S. Patent and Trademark Office, Final Office Action issued on U.S. Appl. No. 15/861,298, dated Feb. 28, 2020, 23 pgs.

EPO, extended European search report issued on European patent application No. 19736080.3, dated Sep. 23, 2021, 8 pgs.

European Patent Office, extended European search report issued of EP patent application No. 17199468.4, dated May 4, 2018, 5 pages.

ISA/US, Int. Search Report and Written Opinion issued on PCT application No. US17/57185, dated Jan. 16, 2018, 15 pages.

(56) References Cited

OTHER PUBLICATIONS

Roku, Petition for Inter Partes Review, IPR2022-00943, dated Apr. 29, 2022, 69 pages.
U.S. Patent and Trademark Office, Non-Final Office Action issued on U.S. Appl. No. 15/861,298, dated Nov. 26, 2019, 25 pgs.
U.S. Patent and Trademark Office, Final Office Action issued on U.S. Appl. No. 15/861,298, dated Aug. 16, 2019, 26 pgs.
U.S. Patent and Trademark Office, Non-Final Office Action issued on U.S. Appl. No. 15/861,298, dated Apr. 11, 2019, 36 pgs.
U.S. Patent and Trademark Office, Non-Final Office Action issued on U.S. Appl. No. 15/861,298, dated Nov. 28, 2018, 21 pgs.
U.S. Patent and Trademark Office, Non-Final Office Action issued on U.S. Appl. No. 17/148,050, dated Aug. 18, 2022, 9 pgs.
Judgment, Final Written Decision on IPR2022-00943, dated Nov. 28, 2023, 39 pp.
JPO, office action issued on Japanese patent application No. 2020-537000, dated Apr. 11, 2023, 8 pgs.
Translation of JPO, office action issued on Japanese patent application No. 2020-537000, dated Apr. 11, 2023, 8 pgs.
EPO, office action issued on application No. 19736080.3, dated Mar. 17, 2023, 7 pgs.

\* cited by examiner

APPARATUS, SYSTEM AND METHOD FOR DIRECTING VOICE INPUT IN A CONTROLLING DEVICE

RELATED APPLICATION INFORMATION

This application claims the benefit of U.S. application Ser. No. 15/647,947, filed on Jul. 12, 2017, the disclosure of which is incorporated herein by reference in its entirety.

BACKGROUND

Dedicated remote controls capable of controlling the operation of consumer electronic devices for receiving voice input, via use of a keypress to activate a microphone, are well known in the art and are generally each capable of controlling the operation of one type of consumer electronic device. Such a dedicated remote control is intended to primarily control the functional operations of a consumer electronic device associated with a consumer brand name. For example, a dedicated Apple brand Siri remote control for an Apple TV brand video streamer can use voice input to control the operations for volume, play, pause, rewind, stop, etc. via use of proprietary communication protocols. These dedicated remotes typically only work with the associated product that they are bundled with and lack the capability to work with other voice controlled consumer electronic devices. Therefore, it would be desirable to provide a controlling device that allows a user to use voice commands to control a plurality of different types of voice controlled consumer electronic devices from a plurality of consumer brand names.

SUMMARY

Described hereinafter are examples of an apparatus, a system and a method that provides for the use of voice commands to control the operation of a plurality of different voice controlled consumer electronic devices and, more particularly, to a controlling device for use in routing a signal, based on voice input from the user, to two or more voice controlled consumer electronic devices, (hereafter referred to as "smart appliances"), from different consumer brand names.

In one example, the controlling device is used to provide formatted voice data to two or more smart appliances. The functional components of the controlling device include: an electronic storage medium having processor-readable code embodied therein for storing a plurality of device profiles, where each device profile comprises a formatting protocol for formatting voice commands received from a user in conformity with a protocol used by a particular smart appliance; a first communication interface for transmitting the formatted voice commands to at least one of the two or more smart appliances; a microphone for receiving voice input from a user; and a processor coupled to the electronic storage medium, the communication interface, and the microphone for executing the processor-readable code.

In operation, the processor-readable code causes the processor of the controlling device to: receive a first voice command via the microphone; the processor is used to determine a first smart appliance to which the first voice command is intended; identify a first formatting protocol in the electronic storage medium which is associated with the first smart appliance; format the voice command into a formatted voice command in conformance with the first formatting protocol; and transmit via the communication interface the formatted voice command to the first smart appliance.

A method is also described for providing formatted voice data to two or more smart appliances which is performed by a controlling device working in cooperation with a smart appliance where the processor of the controlling device receives, via a microphone, a first voice command from a user. The processor then determines a first smart appliance for which the voice commands is intended and identifies a first formatting protocol which is stored in an electronic storage medium and which is associated with the first smart appliance. The processor then formats the received voice command in conformance with a first formatting protocol and sends the formatted voice command to the first smart appliance via use of a communication interface. Similarly, the processor may identify a second smart appliance and send the formatted voice command to that smart appliance where in some embodiments the protocol is a proprietary protocol, a Voice over IP protocol, etc.

Also described is a method for providing formatted voice data to two or more smart appliances which is performed by a controlling device working in cooperation with a smart appliance where the processor of the controlling device receives, via a communication interface, an identification of one or more smart appliances from a smart appliance that is coupled to the controlling device. In this method, the appliance identification may include a predetermined wake-word associated with the smart appliance identification. The processor of the controlling device may store the smart appliance identification in a coupled electronic storage medium and the processor may receive at least a wake-word and a voice command from a user via use of a microphone coupled to the processor of the controlling device. The processor then determines a smart appliance identification, which is stored in the electronic storage medium, which corresponds to the received wake-word and the predetermined wake-word and where the predetermined and received wake-words match. The processor then sends the voice command to the intended smart appliance vis use of a communication interface. In some embodiments, the wake-word may be an alphanumeric consumer brand name, alphanumeric code, user dictation, etc. as needed for the particular application.

Another method is described for providing formatted voice data to two or more smart appliances, which is performed by a controlling device working in cooperation with a smart appliance. This method includes receiving, by a processor of the controlling device, via the microphone, a voice command from a user, transmitting, by the processor of the controlling device, via a communication interface, an HDMI input status request to a coupled smart appliance in response to receiving the voice command, receiving, by the processor of the smart appliance, via a communication interface of the smart appliance, the HDMI input status request whereupon the processor of the smart appliance is caused to detect an active HDMI input, the active HDMI input comprising a signal from an appliance presently being presented by the smart appliance, determine an appliance identification associated with the active HDMI input, send, via the communication interface of the smart appliance, the smart appliance identification to the controlling device at which point the processor of the controlling device receives, via the communication interface of the controlling device, the smart appliance identification and formats the voice command in accordance with a formatting protocol stored in an electronic storage medium of the controlling device associated with the appliance identification.

A system for providing formatted voice data to two or more smart appliances which is performed by a smart appliance in cooperation with a coupled remote server and a controlling device is also described. The system may include a smart appliance, having a processor readable code that causes the smart appliance to: receive a first voice command via a communication interface from a controlling device; format the voice command in conformance with a first formatting protocol; transmit, via the communication interface, the formatted voice command to a remote server where the processor of the remote server receives the formatted voice command, via a communication interface, and uses the voice command to determine a first appliance to which the first voice command is intended; receive a determination of a first appliance for which the voice command is intended from the remote server, via a communication interface, and to transmit, via the communication interface, the formatted voice command to the intended smart appliance.

A better understanding of the objects, advantages, features, properties and relationships of the subject systems and methods will be obtained from the following detailed description and accompanying drawings which set forth illustrative examples and which are indicative of the various ways in which the principles of the invention hereinafter claimed may be employed.

BRIEF DESCRIPTION OF THE DRAWINGS

For a better understanding of the various aspects of the described systems and methods, reference may be had to the illustrative examples shown in the attached drawings in which.

DETAILED DESCRIPTION

Described hereinafter are examples of an apparatus, a system and a method for controlling two or more smart appliances with voice commands and, more particularly, to a controlling device for receiving voice input from a user, for identifying a particular smart appliance to which the voice input is intended, and for formatting the voice input into a digital signal understood by the particular smart appliance.

Figure 1:
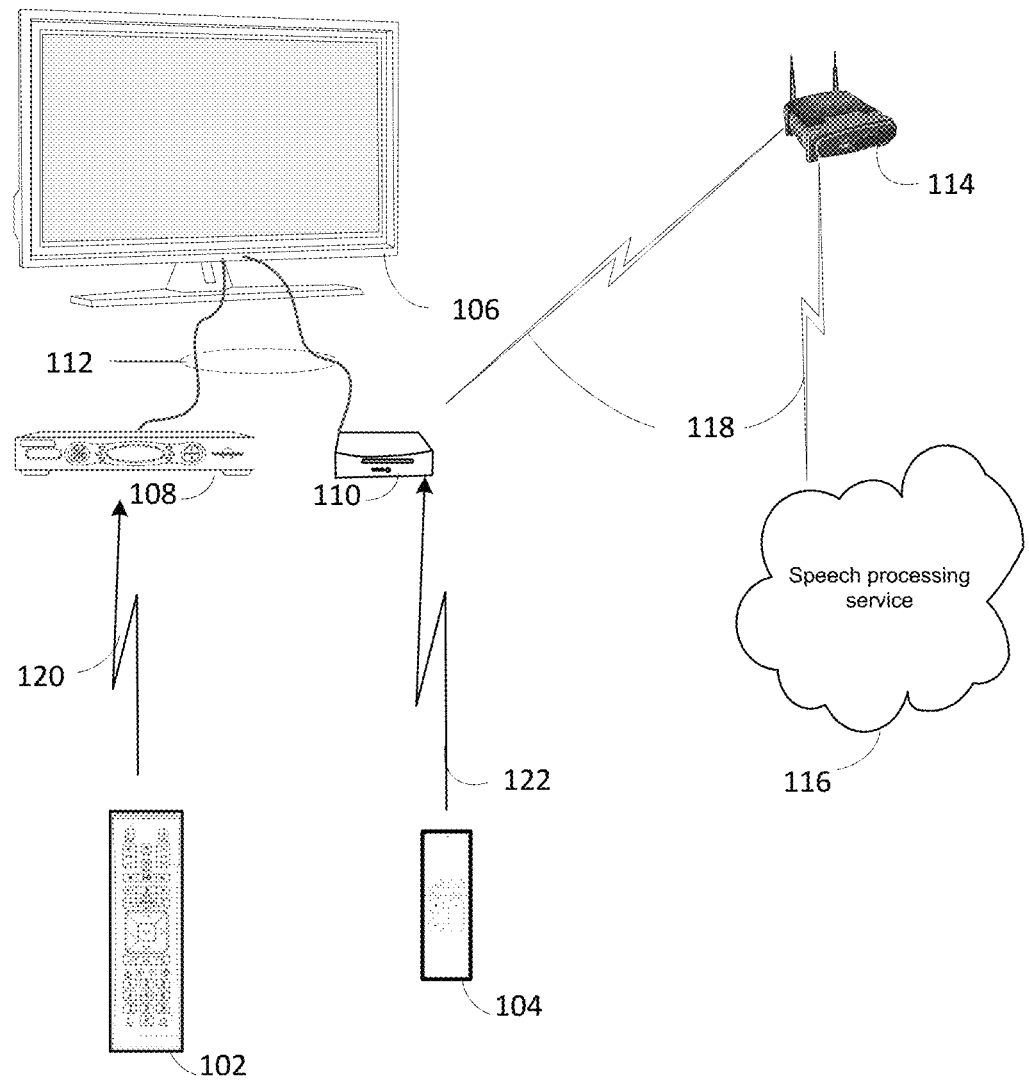
FIG. 1 is a block diagram illustrating a prior art system using a dedicated remote for providing voice data to a smart appliance.

FIG. 1 illustrates a system, known in the art, where a dedicated remote control is operated to primarily control the functional operations of a first smart appliance of the same consumer brand as the dedicated remote via use of voice commands and which is not purposed to communicate with or to control a second smart appliance of a different consumer brand via use of voice commands. This example illustrates two dedicated remote controls, a Comcast brand Xfinity voice remote 102 and an Apple brand Siri voice remote 104, which are used to operate an associated smart appliance, such as a Comcast brand, set-top-box 108, (hereafter referred to as "STB") and an Apple TV brand streamer 110, respectively, via use of voice commands. Some consumer devices are Internet-capable, i.e., they can send or receive content to and/or from sources located within range of a local data network, such as a wireless LAN, or sources located in remote locations via the Internet. Each dedicated remote communicates with an associated smart appliance via a wireless signal 120 and 122 respectively where wireless signals 120 and 122 are different from each other. Generally, the STB 108 and the Apple TV brand streamer 110 are connected to a smart TV 106, (hereafter referred to as "TV"), via an HDMI cable 112, and may also be connected to a wireless router 114, and may use signal 118, to communicate to an internet cloud based speech processing service 116, such as the Comcast brand voice service provider or the Apple brand Siri voice service, for sending a voice command, received by the dedicated remote to the smart appliance, of the same brand, where the smart appliance sends the voice data to an associated speech processing service for interpretation. For example, a user of the Comcast brand Xfinity voice remote 102 presses the microphone key causing the remote to initiate recording the user's voice, such as "Watch ESPN" or "Show me kids movies," and the recording ends when the key is released. The remote then uses a voice-over RF4CE wireless protocol to compress and transmit the recording over a low bandwidth link to the STB 108. The STB 108 then sends the recording to the Comcast brand voice service provider, via router 114, to perform natural language processing (NLP) to interpret the recording, determine the corresponding command and then send the command back to STB 108 for performing the corresponding operation. In this embodiment, the Comcast brand Xfinity voice remote 102 does not support sending voice commands to a smart appliance of a different consumer brand, e.g., the Apple TV brand streamer 110. The operation of cloud based speech-processing services are well known by one skilled in the art and are not described herein.

Figure 2:
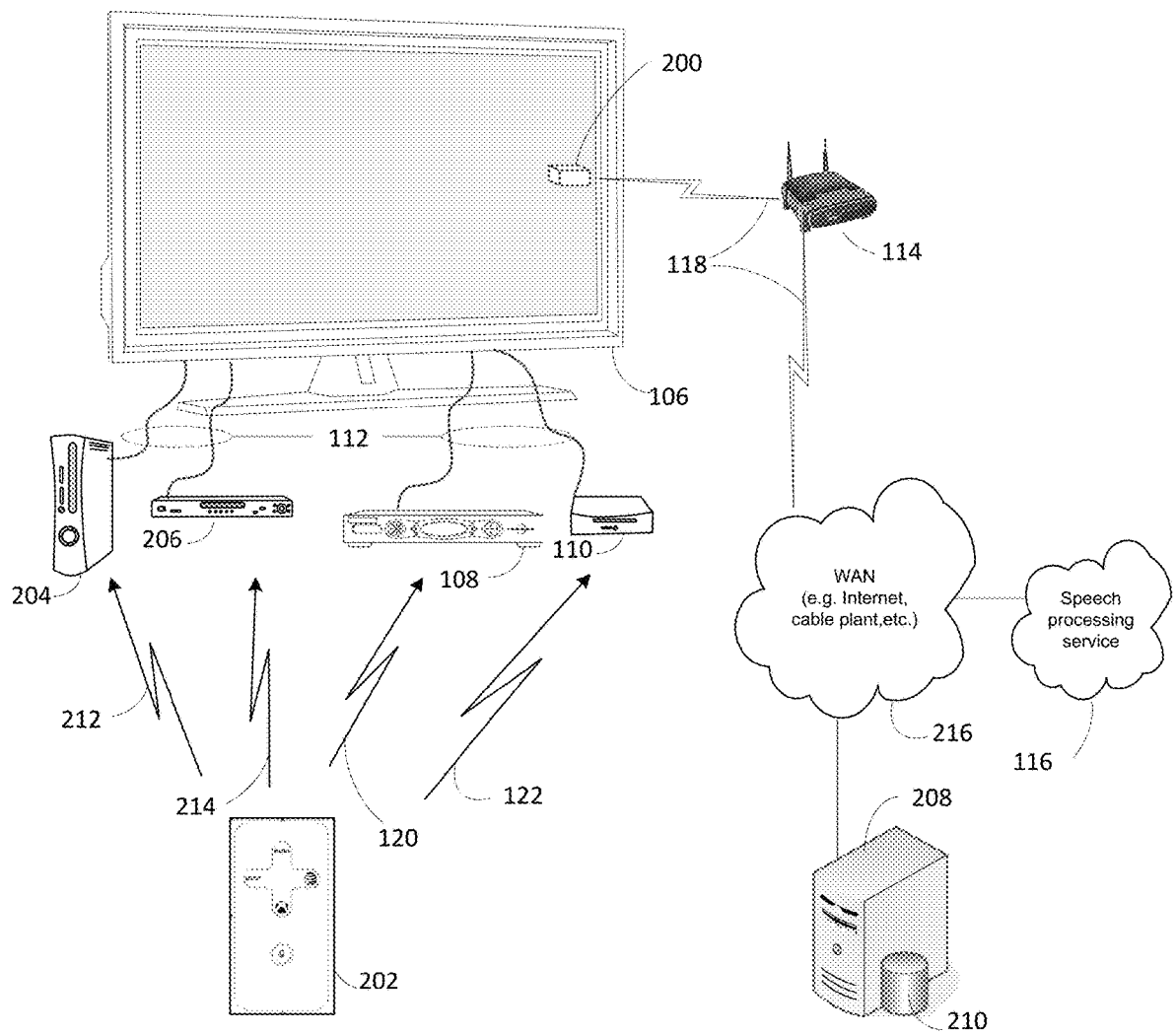
FIG. 2 is a block diagram illustrating a further system using a controlling device for providing formatted voice data to two or more smart appliances.

FIG. 2 illustrates an exemplary system in accordance with the teachings herein and includes a controlling device 202, such as standalone Amazon brand Echo device, (hereafter referred to as "Echo") or to a similar type of device having voice input capabilities which types of devices may include, without limitation, a tablet, a PDA, a cell phone having an associated remote control type app, a smart watch, a computer, a wearable controlling device, a remote control, or an intermediary device purposed to control two or more smart appliances. As will be appreciated from the description that follows, the controlling device 202 is adapted to transmit one or more different wireless signals, such as signals 120, 122, (as also shown in FIG. 1), and/or signals 212 and 214, for reception by a corresponding plurality of intended target devices. Such transmission may use communication protocols such as Voice over IP (VoIP), IP, Smart Wave (S-WAVE), Wi-Fi, Bluetooth low energy (BLE), RF4CE, ZigBee, Z-wave, Infra-red, 6LoWPAN, Thread, Wi-Fi-ah, 2G, 3G, 4G, NB-IoT, 5G, NFC, RFID, SigFox, etc., as needed to communicate commands to two or more smart appliances. In this embodiment, the controlling device 202 is configured to receive voice commands from a user and send formatted versions of the voice commands to a one or more of the smart appliances 108, 110, 204, and 206 as determined by the controlling device 202. In some embodiments, the voice commands are not formatted.

Smart appliances may comprise consumer electronic devices in an end user's home such, as TV 106, STB 108, an Apple TV brand streamer 110 (all as shown in FIG. 1), an Xbox brand gaming system 204 and a Roku brand streamer 206. While illustrated as a TV 106, an Xbox brand gaming system 204, STB 108, a Roku brand streamer 206, and an Apple TV brand streamer 110, it is to be understood that smart appliances may include, but need not be limited to, various televisions, VCRs, DVRs, DVD players, cable or satellite converter set-top boxes, amplifiers, CD players, game consoles, home lighting, smart wireless hubs, drapery, fans, HVAC systems, personal computers, wearable health monitoring devices, or, generally, any consumer product capable of communicating with controlling type devices such as an Echo or smartphones, and/or other smart appliances, in some embodiments via use of a wireless router 114, associated with a wireless signal 118 typically over a local-area network or a wide-area network 216. Such smart appliances are generally connected to TV 106, via HDMI cables 112 or may be connected wirelessly and may operate to send data to a coupled remote server 208, coupled to database 210, to a speech processing service 116, as described in FIG. 1, or both.

The controlling device 202, may be operated by a user, by pressing a soft key or a mechanical key on the controlling device 202 that activates at least a coupled microphone, allowing a user's voice to be recorded and/or streamed and sent to one or more coupled smart appliances (individually and collectively referred to hereinafter as an "appliance"). In one embodiment, the controlling device 202, may be part of an audio-based context recognition system, and in some embodiments, may be part of a contextual command routing system comprising at least one smart appliance coupled to server 208, where the system determines the user's intent to perform an action and determines the intended smart appliance for routing the voice commands to said smart appliance for executing the command. In some embodiments, the determination of the user's intent is performed by a home entertainment system, comprising coupled sensing interfaces, for automating a system response to events which occur in a media viewing area, such as the user's living room. Such a determination of the user's intent may be performed as described in U.S. Pat. No. 9,137,570 which is incorporated herein by reference in its entirety.

In one example, the controlling device 202 may operate by continuously listening for audio-based context (i.e., context based on an audio signal originated by the user uttering a voice command) and sending, via a communication interface, the audio-based context, (hereafter referred to as "a voice command"), to a smart appliance which sends the voice command to a coupled server 208 where the server 208 automatically performs an audio-based context recognition operation such as to automatically determine the contextual command routing and/or determine at least part of a classification, for determining a smart appliance for which the audio-based context was intended.

In this example, a smart appliance, such as TV 106, coupled to server 208, receives the intended appliance determination information directly from server 208, via a first communication interface (e.g., a Wi-Fi receiver), and uses the intended appliance determination information to determine the smart appliance for which the voice command was intended. TV 106 sends, the voice commands to the identified smart appliance, via a second communication interface (e.g., an RF4CE transmitter), for executing the commands (e.g., to turn on, turn off, volume up, volume down, change channel to channel X, etc.).

In another example, the controlling device 202, receives the intended appliance determination information from server 208, via a first communication interface, and sends the voice commands to the identified smart appliance, via a second communication interface, where the smart appliance executes the commands.

In yet another example, server 208 not only determines the intended appliance determination information, but also determines the user's intent for determining the contextual command routing. Then, the command itself is transmitted to either the intended smart appliance via wide-area network 216, to controller 202, or to a smart appliance that forwarded the voice command.

In one example, a first smart appliance receives the intended appliance determination information from server 208, via a first communication interface, uses the appliance determination information to determine the intended smart appliance and sends the commands to the intended smart appliance for executing the commands.

In one example, a first smart appliance receives the intended appliance determination information from server 208 for locally executing the commands.

In another example, a first smart appliance may scan the local-area network for connected smart appliances and may query each smart appliance for state information for determining the intended appliance determination information and for sending the commands to the intended smart appliance.

In another example, a first smart appliance receives the intended appliance determination information from server 208 and sends the appliance determination information to a second smart appliance, where the second smart appliance uses the identification information to determine the identified smart appliance and sends the voice commands to the identified smart appliance, via a second communication interface for executing the commands.

In one example, the smart appliance sends the voice command to an associated speech processing service provider to perform natural language processing or similar processing, to determine the corresponding command which is then sent to the smart appliance for performing the command operation.

In one example, the controlling device 202 records and/or streams, via a communication interface, to a smart appliance, a wake-word, such as "TV", "Google", "Alexa", "Xbox", "Game" or "STB", and a command such as "Turn on", "Play", "Stop", etc. The wake-word is generally purposed to identify a smart appliance and in some embodiments to change a smart appliances power state such as from stand-by to full power. In one example, the controlling device 202, uses the wake-word to determine which smart appliance to send the wake-word to and in one example, a command that is received by controlling device 202 just after receipt of the wake-word.

In another example, the controlling device 202 sends the wake-word and the command to the server 208, via the wide-area network 216 where the smart appliance identification is determined by the processor of server 208 and where the server 208 sends the voice command to that smart appliance.

In another example, the controlling device 202 receives an identification of an intended smart appliance from a smart appliance coupled to the controlling device 202 where the identification of the intended smart appliance includes an associated wake-word and the controlling device 202 stores the information in the electronic storage medium. The controlling device 202 then receives at least a wake-word from a user and uses the wake-word to determine an intended smart appliance which to send the wake-word, or a voice command associated with a smart appliance associated with the wake-word.

As an example, controlling device 202 may send at least the wake-word to TV 106. TV 106 uses the wake-word to determine a smart appliance identification associated with the received wake-word. The smart appliance identification is used by TV 106 to determine the corresponding smart appliance for which the wake-word is intended. The TV 106 then sends the wake-word and associated voice command to the identified smart appliance for execution of the command.

In another example, a smart appliance, in a cooperative operation with the controlling device 202 and server 208, is configured in a provisioning process to enroll each smart appliance, located in the user's home and detected by the smart appliance, using a predetermined voice command that is spoken by the user during the provisioning process, such as a learning operation, and which associates a voice command with a smart appliance which supports that voice command. For example, a user, via use of the controlling device 202, may utter a predetermined voice command, such as "Play music," "Pause movie," "Start recording," etc. In this embodiment, the controlling device 202 sends the voice command to the smart appliance for provisioning, where the smart appliance, via use of database 210 accessible by server 208, receives instructions corresponding to the voice command and an identify for the intended smart appliance for the command from server 208.

For example, the voice command "Play music" may be associated by server 208, with a smart appliance that supports streaming music, such as a detected Apple TV brand streamer 110. Similarly, the voice command "Pause movie" may be associated by the server 208 with a Roku brand streamer 206 and "Start recording" may be associated with STB 108. Thereafter, when the user utters the voice command "Play music," via use of the controlling device 202, the provisioned smart appliance causes the Apple TV brand streamer 110 to perform an operation to stream music.

In yet another example, the controlling device 202 receives a voice command, which automatically causes an input status request, such as a request to detect an active source/sink port, a request for status of a communications bus, etc. to be sent by the controlling device 202 to TV 106 where TV 106 performs an operation to detect an active input, from a number of possible inputs, to determine an associated appliance identification selected from a plurality of appliance identifications stored in the electronic storage medium of TV 106. TV 106 then uses the appliance identification to send the voice command to the identified smart appliance.

In one example, the controlling device 202 receives configuration information from TV 106, coupled to a remote server 208, using an identification of a smart appliance from a plurality of coupled smart appliances which are located in an end user's home. In this example, the configuration information comprises a plurality of smart appliance profiles (hereafter referred to as "device profiles") which are provisioned to TV 106 by server 208. For example, server 208 receives an identification of a plurality of smart appliances, located at an end user's home, from TV 106 where TV 106 performs an operation to detect other connected smart appliances and provisions that information to the remote server 208. The server 208, in turn, analyzes the information to determine a device profile for each of the detected smart appliances. The server 208 stores the device profile for each of the detected smart appliances in a database 210 and sends the device profile for each of the detected smart appliances to TV 106, where TV 106 then sends the configuration to the controlling device 202. The controlling device 202, may receive configuration information from coupled TV 106, comprising a Universal Control Engine 200, (hereafter referred to as "UCE") via a provisioning process which is described in further examples below.

Furthermore, any of the smart appliances, shown in FIG. 2, may operate in a cooperative operation such as by having any smart appliance act as a master device and the server 208 act as a slave device or vice versa, for the purpose of sending one or more device profiles to the controlling device 202 or to another coupled smart appliance. The device profiles may be stored locally in the electronic storage medium associated with controlling device 202 or in the electronic storage medium of a smart appliance.

It is to be understood that, while the user's voice command is described as a recording, the voice command may be streamed, in real time, by the controlling device 202, may be partially streamed or may be temporarily stored in an electronic storage medium of the controlling device 202. Furthermore, while a determination operation is described as a cross-referencing operation it is understood that other methods may be performed by server 208 to determine a relationship, such as using a predetermined operations map, using an index, using a pairing table and may use one or more of the methods.

Figure 3:
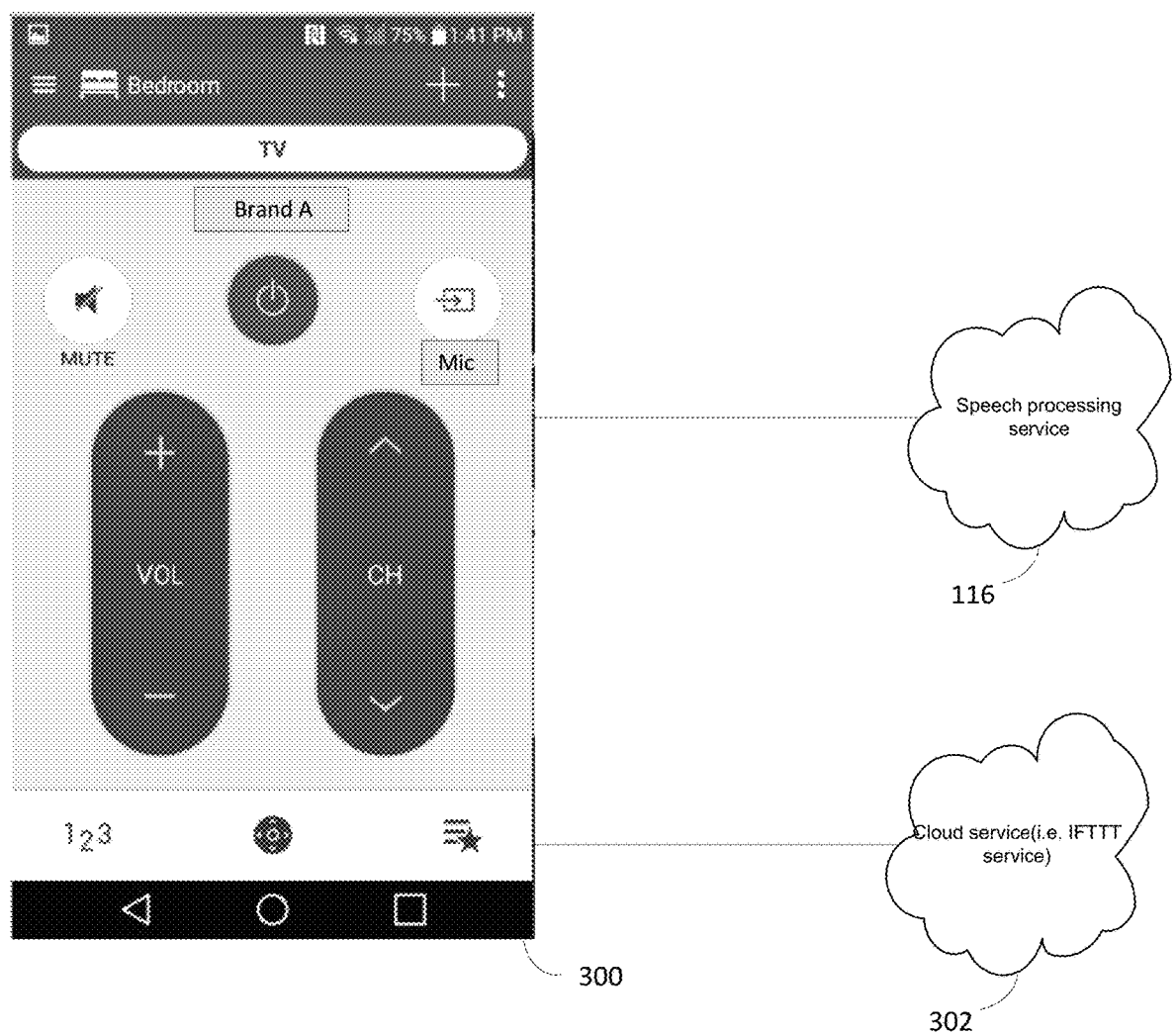
FIG. 3 is an illustrative example of a still further system using a controlling device and an associated app for providing formatted voice data to two or more smart appliances.

FIG. 3 is an example of a system using the controlling device 202, having an associated control app and coupled to a server 208, for providing voice commands to two or more smart appliances. Control type apps, (hereafter referred to as "apps"), are well known in the art and are not described herein. In this embodiment, controlling device 202, via use of an app having an appropriate app interface 300 may initiate an operation where the controlling device 202, may determine to which smart appliance each voice command is directed, may format voice commands in accordance with a smart appliance to which the voice command is intended, and may determine a transmission technology to transmit formatted voice commands to the intended smart appliance. For example, a user may press a soft key on the user interface provided to the controlling device 202 that activates a microphone of the controlling device 202. Then, the user may utter a voice command, which is received by controlling device 202 and then processed to determine to which smart appliance the voice command is intended. Next, the voice command is formatted into a digital signal that is understood by the determined smart appliance.

In one example the app, via use of the associated microphone, may listen for a voice command and when the voice command is received, the app sends a request to a smart appliance to perform a local operation to dynamically scan the local-area network for connected smart appliances, query each smart appliance for state information, such as the media content currently available on a particular smart appliance, supported commands, etc. For example, TV 106 may initiate a query to one or more smart appliances such as STB 108 and Apple TV brand streamer 110 where each smart appliance sends, in real-time, information to TV 106, related to what activity is being performed on each smart appliance. Such activity information may comprise available current media content such as a TV show or movie being watched on the Apple TV brand streamer 110, photos being viewed, active apps and their displayed content on STB 108, supported commands, and may include information such as an identification of a last user action or command that was performed by each smart appliance. In some examples, the activity information may be displayed partly or in full on a display coupled to the smart appliance or may be provisioned by a first smart appliance to a second smart appliance, for displaying the information.

In another example, the activity information may be displayed in a display coupled to the controlling device 202, where the activity information contains activable links which, when activated by a user via use of an app installed on controlling device 202, cause the smart appliance to perform the corresponding command such as "Play," "Stop," etc.

In one example, determination of a smart appliance to which the voice command is intended is performed by a speech processing service 116 or by a cloud server 302 after the controlling device 202 transmits the voice command to a dedicated smart appliance tasked to relay the voice command from the controlling device 202 to such a speech processing service or cloud service. The identification and/or other information of a smart appliance that the voice command was intended to command is then received back at the smart appliance whereupon the identification and/or other information is provided to the app. Alternatively, the app may send voice commands directly to a speech processing service 116, or to an associated cloud service 302, directly via wireless router 114 or via use of a cellular network, eliminating the need for a smart appliance to relay this information to/from a remote server. The speech processing service 116 or cloud service 302 may then send information/instructions directly back to the controlling device 202.

In one example, the app may comprise instructions which may be used to provision the cloud service 302, such as If This Then That (hereafter referred to as "IFTTT") type instructions, for automating one or more predefined IFTTT operations which cause the one or more predefined operations to be sent by the IFTTT service to one or more smart appliances, such as TV 106, which are coupled, via UCE 200, to the IFTTT service. Similarly, such operations may be prepopulated at the cloud service 302 via use of the work flow tools or may be populated by the app to the IFTTT service during a set up operation.

In one example, the app continuously or at a predetermined time interval sends a request to a smart appliance to scan the local-area network for connected smart appliances and query each smart appliance for state information.

It is to be understood that while described as a stand-alone app, one or more coupled apps, which may be installed on one or more smart appliances, may cooperate to provision the controlling device 202, the cloud service 302 or TV 106 for providing formatted voice commands to two or more smart appliances. Furthermore, one or more apps may cooperate to respond to a request, to scan the local-area network for connected smart appliances and query each smart appliance for state information, originated by a smart appliance or by a controlling device 202. In some examples, the apps may be synched via use of a set up agent program resident in a smart appliance or in the controlling device 202. Further details may be found in U.S. application Ser. No. 14/277,968 which is incorporated herein by reference in their entirety.

Figure 4:
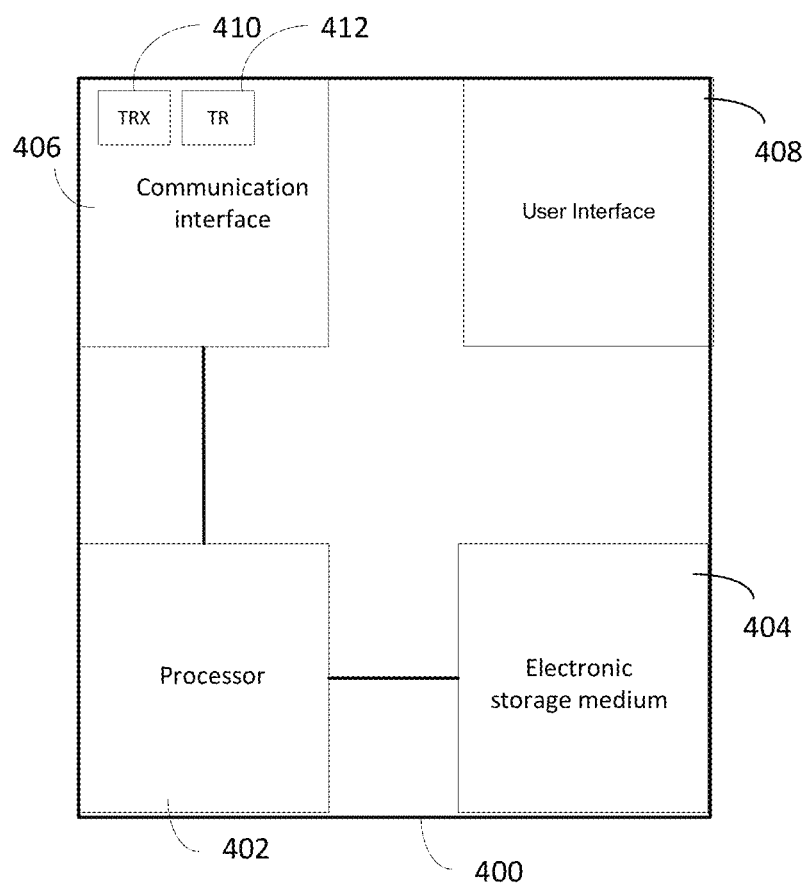
FIG. 4 is a functional block diagram of an example controlling device shown in FIG. 2, for providing formatted voice data to two or more smart appliances.

FIG. 4 illustrates a functional block diagram 400 of one example of a controlling device for providing formatted voice commands to two or more smart appliances, such as the controlling device 202 shown in FIG. 2. The controlling device 202, in this example, comprises a processor 402, an electronic storage medium 404, a communication interface 406, a user interface 408, at least one transceiver 410 and at least one transmitter 412.

The processor 402 may be configured to provide general operation of the controlling device by executing processor-executable instructions stored in the electronic storage medium 404, for example, executable code. The processor 402 typically comprises a general-purpose microprocessor, although any one of a variety of microprocessors, micro-computers and or microcontrollers may be used alternatively, chosen based on factors such as computing power, cost, size, etc.

The electronic storage medium 404 comprises one or more information storage devices such as ROM, RAM, Flash, other type of electronic, optical or mechanical electronic storage medium device, or any combination thereof. Electronic storage medium 404 may be used to store processor-executable instructions for operation of the controlling device 202. It will also be appreciated that some or all of the illustrated electronic storage medium may be physically incorporated within the same IC chip as processor means 402.

As will be understood by those skilled in the art, some or all of the electronic storage medium 404 may store a plurality of device profiles, where each device profile comprises a formatting protocol for formatting voice commands in conformity with a protocol used by a particular smart appliance, may store a plurality of wake-words and/or voice commands which may be associated with one or more device profiles. For example, a first device profile may specify the format of one or more digital signals for voice operation of TV 106, e.g., to cause TV 106 to change channels, input, volume, etc., while a second device profile may specify the format of one or more digital signals for voice operation of STB 108, e.g., to change channels, control volume, etc.

The communication interface 406 comprises one or more data interface circuitry, such as well-known Ethernet, Wi-Fi, RF4CE, Bluetooth, or USB circuitry, that allows wireless communication between the controlling device 202, and the smart appliances, and in some embodiments, between the controlling device 202 and wireless router 114 for communication therewith and the server 208, via the wide-area network 216. In one embodiment, the communication interface 406 comprises one or more data interface circuitry, such as at least one transceiver 410 and at least one transmitter 412, that allows communication between coupled smart appliances. In this embodiment, a transceiver 410 may support a first wireless protocol which is used to communicate with a first smart appliance and a second transceiver 410 may support a second wireless protocol which is used to communicate with a second smart appliance for providing formatted voice data to each of the smart appliances.

The user interface 408 comprises a user input device, for allowing a user to control operations of the controlling device 202. The user input typically comprises at least one or more soft keys or mechanical keys for allowing a user to enter commands or information into the controlling device 202. In one example, user interface 408 comprises a microphone coupled to processor 402 for receiving a user's voice commands and converting the voice commands into electronic signals, as is well-known in the art.

It should be understood that the functional blocks may be coupled to one another in a variety of ways other than which is shown in FIG. 4 and that not all functional blocks necessary for operation of controlling device 202 are shown, such as a power supply, a microphone, one or more accelerometers, a multiple-axis gyroscope, a variety of other transceivers and transmitters each comprising a different wireless protocol, for purposes of clarity.

Figure 5:
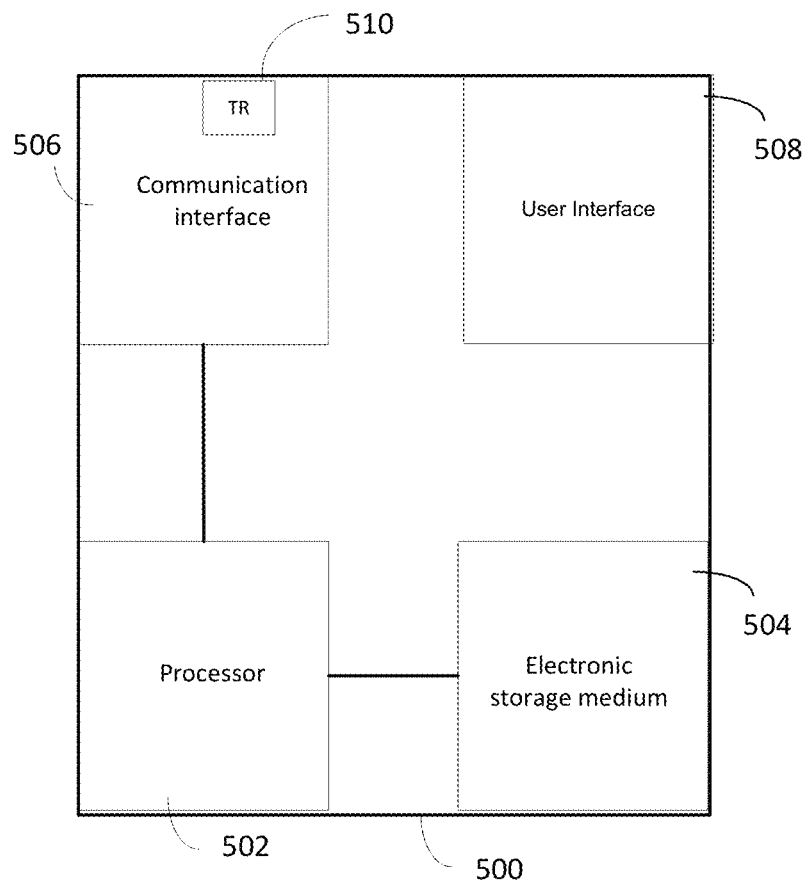
FIG. 5 is a functional block diagram of an example smart appliance as shown in FIG. 2, used for providing formatted voice data to two or more smart appliances.

FIG. 5 illustrates a functional block diagram 500 of one example of a smart appliance, such as the TV 106, STB 108, an Apple TV brand streamer 110 (each as shown in FIG. 1), an Xbox brand gaming system 204 and a Roku brand streamer 206 (each as shown in FIG. 2). Such smart appliances are generally controlled by means of voice commands, may be speaker-independent, i.e. the smart appliances may respond to multiple voices, and may respond to multiple commands at once. In some embodiments, smart appliances may identify and or authenticate the speaker, i.e. the user, via a local operation, and may send the received voice input to a speech processing service 116, via the wide-area network 216 or via use of a cellular network.

In this example, the smart appliance comprises a processor 502, an electronic storage medium 504, a communication interface 506, a user interface 508 and a transceiver 510. It should be understood that the functional blocks may be coupled to one another in a variety of ways other than which is shown in FIG. 5 and that not all functional blocks necessary for operation of the smart appliance are shown, such as a power supply, a variety of other transceivers and transmitters each comprising a different wireless protocol for purposes of clarity.

The processor 502 is configured to provide general operation of a smart appliance by executing processor-executable instructions stored in the electronic storage medium 504, for example, executable code. The processor 502 typically comprises a general-purpose microprocessor, such as an Intel Core I7 brand or an AMD K10 brand microprocessor, although any one of a variety of microprocessors, microcomputers and or microcontrollers may be used alternatively, chosen based on factors such as computing power, cost, size, etc.

The electronic storage medium 504 comprises one or more information storage devices such as ROM, RAM, Flash, other type of electronic, optical or mechanical electronic storage medium device, or any combination thereof. Electronic storage medium 504 may be used to store processor-executable instructions for operation of the smart appliance. It will also be appreciated that some or all of the illustrated electronic storage medium may be physically incorporated within the same IC chip as processor means 502.

As will be understood by those skilled in the art, some or all of the electronic storage medium 504 may store instructions or data that is particular to each type of smart appliance to be controlled. For example, instructions for TV 106 may comprise instructions to receive television programming via the communication interface 506 and display one of the television programs on a display, in accordance with commands received from the controlling device 202.

Other instructions cause a smart appliance to receive instructions from the controlling device 202, such as a wake-word or a voice command, where processor 502 uses the voice command to determine a smart appliance identification associated with the voice command. The smart appliance then sends the appliance identification to the controlling device 202 or to a coupled smart appliance via the wide-area network 216.

Still other instructions cause the smart appliance to receive instructions from the controlling device 202, which cause processor 502 to initiate a detection process, such as a detect/request the active source/sink/port on the audio-video/communications bus status request, to detect an active HDMI input. The smart appliance then determines a smart appliance connected to the active HDMI input and sends the appliance identification to the controlling device 202 or to a coupled smart appliance. The controlling device 202 or the coupled smart appliance then uses the appliance identification to send the voice command to the identified smart appliance. In some examples, the smart appliance sends the appliance determination to server 208 for determining the contextual command routing. Server 208 then sends the voice command to the identified smart appliance. In another example, server 208 sends the voice command to the smart appliance, that determined which smart appliance was connected to the active HDMI input, for either executing the command or for forwarding the command to the appliance connected to the active HDMI input.

The communication interface 506 comprises one or more data interface circuitry, such as transceiver 510, Ethernet, Wi-Fi, RF4CE, Bluetooth, or USB circuitry, that allows digital communication, between the smart appliance and other coupled smart appliances, the smart appliance and the controlling device 202, via a local area network provided by wireless router 114, as well as between the smart appliance and the server 208, via the wide-area network 216. In this embodiment, a transceiver 510 may support a wireless protocol, which is used to receive the voice commands from the controlling device 202, may decode, compress or perform other operations as necessary to transmit the voice commands to a speech processing service 116.

The user interface 508 comprises a user input device and/or a user output device, for allowing a user to control operation of the smart appliance. The user input typically comprises one or more pushbuttons, keys, a touchscreen display, etc. for allowing a user to enter commands or information into the smart appliance. The user output device typically comprises a display screen, a touchscreen display, lights, amplified sound bars, etc. for presenting media content to a user as desired/needed.

It should be understood that the functional blocks may be coupled to one another in a variety of ways other than which is shown in FIG. 5 and that not all functional blocks necessary for operation of a smart appliance are shown, such as a power supply, a variety of other transceivers and transmitters each comprising a different wireless protocol, for purposes of clarity.

Figure 6:
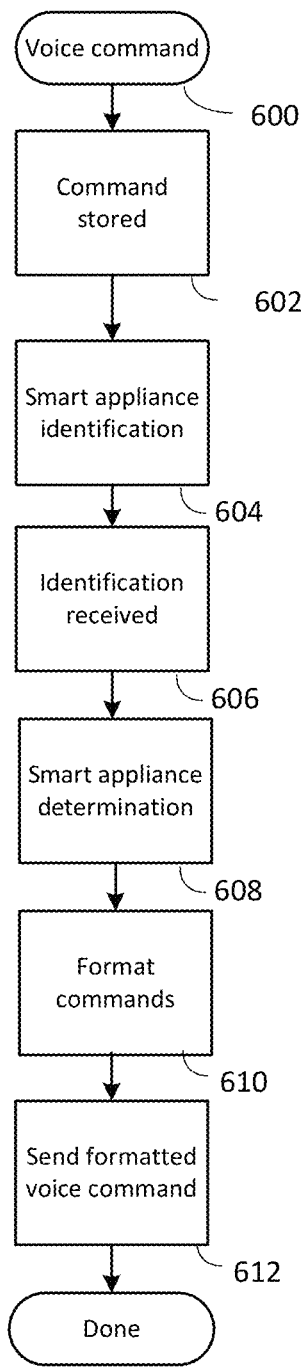
FIG. 6 is a flow diagram illustrating an example method for enabling voice control of two or more smart appliances.

FIG. 6 is a flow diagram of one example method for enabling voice control of two or more smart appliances. The method is implemented by processor 402 located within controlling device 202, by executing processor-executable instructions stored in electronic storage medium 404. It should be understood that in some examples, not all of the steps shown in FIG. 6 are performed and that the order in which the steps are carried out may be different. It should be further understood that some minor method steps, which would be known to those of ordinary skill in the art, have been omitted for purposes of clarity.

At block 600, a user of controlling device 202 utters a voice command into controlling device 202, via user interface 408. In one example, the user first presses a key on controlling device 202 in order to activate a microphone on controlling device 202.

At block 602, the voice command is received by processor 402 via user interface 408 and typically stores the voice command in electronic storage medium 404.

At block 604, processor 402 determines to which smart appliance the voice command is intended. In one example, processor 402 evaluates the voice command and determines that the voice command is intended for a particular smart appliance, in this example, TV 106. The determination operation is performed in accordance with one or more of the examples described above.

In another example, processor 402 transmits the voice command in a predetermined format for reception by a predetermined one of the smart appliances. In this example, processor 402 is pre-configured to communicate with one of the smart appliances and transmits the voice command in a format understood by the predetermined smart appliance. The predetermined smart appliance may be different than the smart appliance for which the voice command was intended. The predetermined smart appliance receives the voice command and then forwards it to remote server 208. Remote server 208, in turn, processes the voice command, to determine an identification of a smart appliance type or a particular smart appliance for which the voice command was intended. For example, server 208 can interpret the voice command and extract one of a number of predetermined commands, such as "volume up," "volume down," "change channel," "TV on (off)," "Roku on (off)," etc. Based on the interpretation, server 208 identifies at least a smart appliance type that the voice command was intended. For some voice commands, such as "TV on (off)," "Roku on (off)," where an identification of a particular smart appliance is contained within the voice command, determination of the intended smart appliance is simply a matter of interpreting the voice command to extract the mentioned smart appliance. In other voice commands, such as "volume up," "volume down," or "change channel," server 208 may identify key words in the voice command and determine a likely intended smart appliance by associating the key words with smart appliance types stored by server 208. For example, if server 208 determines that the word "volume" was uttered, server 208 may determine that the voice command was intended either for TV 106 or for set-top box 110. Server 208 then returns an identification of the intended smart appliance to remote controlling device 202, either directly via wireless router 114 or via a predetermined smart appliance.

At block 606, the controlling device 202 receives the identification of the intended smart appliance from server 208, via transceiver 410, which provides the identification to processor 402.

At block 608, processor 202 receives the identification and may determine a particular smart appliance for which the voice command was intended based on the smart appliance identification type. For example, server 208 may have identified a TV for which the voice command was intended. Processor 402 then determines a particular brand and/or model of TV in use, and operational capabilities, such as voice command, wake-word, preinstalled apps, content being watched, supported wireless protocols, user preferences, etc., based on and earlier provisioning process.

The provisioning process comprises sending signals to the discovered smart appliances that causes the other smart appliances to provide their device information, such as EDID, CEC, vendor name, device type, device status, installed apps, current media content being played on the device, media content logos, Infoframe, SSDP, MDNC, IP mDNS Service List, supported wireless protocols such as VoIP, IP, Smart Wave (S-WAVE), Wi-Fi, Bluetooth low energy (BLE), RF4CE, ZigBee, Z wave, Infra-red, etc., to the requesting one or more smart appliances. For example, the provisioning process may be used to determine smart appliances comprising the same operational capabilities. For such devices, the user may prefer to watch a TV program on a particular smart appliance and set the user preferences accordingly. In this embodiment, the user preferences are aggregated to the device profiles. Further details of such device detection may be found in U.S. Pat. Nos. 8,812,629, 8,558,676, 8,659,400, 8,830,074, 8,896,413, 9,215,394, 9,437,105, 9,449,500 and 9,019,435 all of which are incorporated herein by reference in their entirety.

At block 610, processor 402 formats the voice command stored in electronic storage medium 404 into a data format in accordance with the formatting protocol associated with the identified smart appliance.

At block 612, processor 402 transmits the formatted voice command to the identified smart appliance via transmitter/transceiver 410 and or 412. The formatting protocol used to format the voice command may additionally comprise a transmission protocol in which to transmit data. For example, a formatting protocol stored within electronic storage medium 404 in association with TV 106 may indicate that wireless data needs to be transmitted via an RF4CE transmitter. In this case, processor 402 routes the formatted voice command to an RF4CE transmitter and causes the RF4CE transmitter to transmit the formatted voice command to TV 106.

The device profile, as partially described in FIG. 2, comprises the entirety of the smart appliance information such as the data identified during the provisioning process performed by a smart appliance which data typically comprises the smart appliance's metadata, attributes, preferences as set by the user, a formatting protocol for formatting voice commands in conformity with a protocol used by a particular smart appliance, supported network or communication protocols, voice command code structure or format, voice service or operational capabilities, state information, etc., for a plurality of smart appliances, which may be stored in database 210 and accessible by server 208.

These commands and operational capabilities define the set of "verbs" and "grammars" that can be correlated to this appliance.

In one example, the TV 106, in response to receiving the device profiles from server 208, may send, via the communication interface 506, the device profiles to a second coupled smart appliance for use in configuration of a controlling device 202 and wherein the device profiles are in a format used by the second smart appliance. For example, a first smart appliance may send the device profiles received from server 208 to a second smart appliance, acting as an intermediary device, or may send one or more of the device profiles to the controlling device 202 for storing in the electronic storage medium 404.

In yet another example, the device profiles are provided to the controlling device 202 by a cloud service 302, via use of a wide-area network 216. The controlling device 202 may then store the device profiles locally in electronic storage medium 404.

In one example, the device profile may be received by processor 402, in raw format, may be restructured, by processor 402, to a particular data structure by executing readable code comprising a set of procedures for creating the data structure. In one example, the data structure is an array. In another example, the data structure is a list. In yet another example, the data structure is a combination of one or more data types as needed for the processor 402 to perform a data restructuring operation.

In another example, the processor 402, may perform a local operation to cross-reference the discovered appliance information to the appliance metadata, stored in the electronic storage medium 404 or via a cross-referencing operation performed in cooperation with server 208 for each identified smart appliance. In this example, server 208 determines information, via use of database 210, which equals or resembles the appliance information of an analogous smart appliance in some respect for the purpose of generating, or aggregating data to, a device profile or device fingerprint. The appliance metadata comprises smart appliance attributes, such as EDID, CEC, device type, features supported, etc., which may be complementary to the discovered appliance information and typically includes a plurality of other appliance related information, such as cloud based appliance services, such as services which are made available by the appliance's manufacturer, associated voice processing service, capabilities, preferred communication method, supported network or communication protocols, command code structure or format, etc., for a plurality of smart appliances.

Additionally, the device profile may comprise a signal of an identical structure to the signal sent by the original remote control of the smart appliance, (e.g., a Comcast brand Xfinity voice remote 102 to operate a Comcast brand, STB 108, or an Apple brand Siri voice remote 104 to operate an Apple TV brand streamer 110 (each as shown in FIG. 1), for sending voice commands to the smart appliances, and the signal may be sent by a controlling device 202, via communication interface 406, to a first coupled smart appliance, via a signal that resembles the signal of the original remote control from the same smart appliance manufacturer. Similarly, the controlling device 202 may send a different signal to a second smart appliance, via use of a signal that resembles the signal of the original remote control associated with the second smart appliance.

In another example, the processor 402, may dynamically generate a device profile in real-time, via use of the discovered appliance information and/or via performing an on-line search, via communication interface 406 and via use of wide-area network 216, to obtain related smart appliance metadata, such as from the internet or other cloud based servers. When the operation is complete, the device profile may be stored in the electronic storage medium 404, or may be stored in the electronic storage medium of a coupled server or cloud service 302.

In another example, the device profiles are provisioned to TV 106, comprising UCE 200, by server 208, via communication interface 506, or are provisioned by a cloud service 302, via use of a wide area network 216, to TV 106.

In any of the examples, each device profile comprises a formatting protocol for formatting voice commands in conformity with a protocol used by a particular smart appliance and the functionality for gathering the identification of smart appliances information from smart appliances located at an end-user's home may be performed by a Universal Control Engine (UCE) 200 as described in U.S. Pat. No. 9,215,394 which patent is incorporated herein by reference in its entirety. In one example, when a smart appliance, comprising a UCE 200 is initially powered on, an automatic provisioning process may be initiated for identifying or detecting smart appliances on the same local network as the smart appliance containing the UCE 200. Alternatively, the provisioning process may be initiated by a key press on the controlling device 202 or via a voice command recognized and acted on by the smart appliance. Such a provisioning process is described in U.S. Pat. No. 9,307,178 which is also incorporated herein by reference in its entirety.

In one example, the controlling device 202, comprises an electronic storage medium 404 having processor-readable code embodied therein and storing a plurality of smart appliance profiles where each device profile comprises a formatting protocol for formatting voice commands in conformity with a protocol used by a particular smart appliance and where the device profiles are provisioned to the smart appliance by server 208. In this example, the controlling device 202, receives, via a microphone, a first voice command from an end user, which is used by the controlling device 202 to determine a first smart appliance to which the first voice command is intended. The controlling device 202 then identifies a first formatting protocol, in the electronic storage medium associated with the first smart appliance, formats the voice command into a formatted voice command in conformance with the first formatting protocol and sends the formatted voice command to the first smart appliance.

For example, the user may press the microphone key and utter one or more words or sounds for selecting a particular smart appliance, such as the Apple TV brand streamer 110. The controlling device 202, determines the device profile associated with that smart appliance based on the voice command, and identifies the proper signal or protocol to use for communicating with the Apple TV brand streamer 110. The controlling device 202 formats the voice command into an identical voice command of the Apple brand Siri voice remote 104. The controlling device 202 then sends the voice command to the Apple TV brand streamer 110. The controlling device 202 receives a second voice command and similarly determines a second smart appliance, such as STB 108, to which the second voice command is intended. The controlling device 202 then sends the formatted voice data to the STB 108. In some examples, a device profile comprises a definition of how to send voice to the smart appliance and the controlling device 202 may perform a local operation to determine which smart appliance is associated with the voice command and may determine one or more methods of how to send the voice command.

In one example the controlling device 202, may listen for a voice command and when the voice command is received, the controlling device 202 sends a request to a smart appliance to perform a local operation to scan the local-area network for connected smart appliances and to dynamically query each smart appliance for state information. Such state information comprises apps installed and/or supported, power state of a smart appliance (i.e. On/Off), current media state such as playing a particular song or watching a particular video stream, supported commands and/or scripts, etc. In some examples, the state information may be used by the smart appliance which performed the query or by server 208 for defining the context for the commands.

In one example, state information may be obtained by a first smart appliance performing a signal sniffing operation, such as an audio signal listening operation, to determine a media that is currently playing in a specific location. In this example, the smart appliance contains the necessary hardware and programming to perform said signal sniffing operation. Signal sniffing operations are well known in the art and are not described herein.

In one example, the smart appliance receives codes or scripts for the connected smart appliances from server 208, coupled to database 210 where database 210 comprises a plurality of smart appliance codes and/or scripts for use in communicating with connected smart appliances and where the codes and/or scripts are used to identify context and the intended smart appliance. For example, when a user utters "Pause," contextually server 208 will provide priority to a smart appliance which is currently playing a song.

For example, TV 106 may initiate a query to one or more smart appliances such as STB 108 and Apple TV brand streamer 110 where each smart appliance sends, in real-time, information to TV 106, related to what activity is being performed on each smart appliance. Such activity information may comprise available current media content such as a TV show or movie being watched on the Apple TV brand streamer 110, photos being viewed, active apps and their displayed content on STB 108, supported commands, and may include information such as an identification of a last user action or command that was performed by each smart appliance. In some examples, the activity information may be displayed partly or in full on a display coupled to the smart appliance or may be provisioned by a first smart appliance to a second smart appliance for displaying the information.

In another example, the activity information may be displayed in a display coupled to the controlling device 202, where the activity information contains activable links which when activated by a user, via use of an app installed on controlling device 202, cause the smart appliance to perform the corresponding command such as "Play," "Stop," etc.

In another example, a controlling device 202 receives configuration information from a remote server 208, using an identification of a smart appliance from a plurality of coupled smart appliances. For example, server 208 receives an identification of a plurality of smart appliances located at an end user's home from TV 106. In this example, one or more of the smart appliances performs an operation to detect other connected smart appliances and provisions that information to the remote server 208. The server 208, in turn, analyzes the information to determine a device profile for each of the detected smart appliances. The server 208 stores the device profile for each of the detected smart appliances in a database 210 and directly sends the device profiles for each of the detected smart appliances to the controlling device 202. In some examples, a device profile comprises one or more supported commands and operational capabilities which define the set of verbs and grammar that are correlated to a smart appliance and may comprise a second definition of how to send voice to the smart appliance.

In yet another example, a controlling device 202 receives configuration information from a cloud service 302, via a wide-area network 216. In this example, one or more of the smart appliances performs an operation to detect other connected smart appliances and provisions that information to the cloud service 302. The cloud service 302, in turn, analyzes the information to determine a device profile for each of the detected smart appliances. The cloud service 302 then sends the device profiles for each of the detected smart appliances to the controlling device 202.

In another example, a device having a microphone receives and sends a voice command to the controlling device 202, such as an Echo or to a similar type of smart appliance, which is coupled to a voice-controlled intelligent personal assistant service, such as Amazon brand Alexa brand device, which uses itself as a home automation hub, and which is communicatively coupled to a speech processing service 116, a cloud service 302 or to server 208. In this example, the controlling device 202 sends the voice command to the Echo imitating the signal of the Amazon brand Alexa brand voice remote control. The Echo sends the voice command to the Alexa brand service, where the Alexa brand service, in a cooperative process with server 208 and a cloud service 302, such as IFTTT, provision the IFTTT service for automating one or more predefined IFTTT operations which cause the one or more predefined operations to be sent by the IFTTT service to one or more smart appliances, such as TV 106, which are coupled, via use of the UCE 200, to the IFTTT service. The one or more operations are received by TV 106, via communication interface 506, for performing the particular operations, by processor 502. Such operations may be prepopulated at the cloud service 302, may be prepopulated in the controlling device 202, via an app associated with the IFTTT service and/or may be populated during the set-up of the IFTTT service associated with the Alexa service and TV 106. IFTTT services and operations are well known by one skilled in the art and are not described herein For example, if a user utters the words, "Alexa I want to play Xbox," the controlling device 202 determines that the user desires to use the Echo based on the voice command, and identifies the proper signal or protocol to use for communicating with the Echo. The Echo then sends the voice command to the Alexa brand service, which is coupled to a cloud service 302, such as the IFTTT service or to a similar service. The IFTTT service determines the predefined operations, via use of an applet or a recipe, to provision the determined operations to server 208, via the internet. Server 208 receives the one or more operations, via the internet, from the IFTTT service to provision, by processor 502, TV 106. TV 106 receives the operations, via communication interface 506, and processor 502 executes the one or more received operations.

For example, the words, "Alexa I want to play Xbox", may be a predefined phrase or a series of predefined operations which are associated with the IFTTT service and which are associated with a cloud service 302. Such operations may comprise automatically changing the HDMI input at TV 106, powering on the Xbox brand gaming system 204, setting the volume to a predetermined level, dimming the lights to a predetermined level, etc. The one or more operations may be in the structure of one or more IFTTT applets, which may be consolidated into a single work flow, for having multiple operations execute simultaneously or the operations may be executed at a predetermined time interval. It is to be understood that, unless otherwise stated to the contrary, one or more of the described operations may be received and/or executed by TV 106 or may be received and/or executed by one or more coupled smart appliances.

It is to be understood that the controlling device 202, as shown, FIG. 2 may include a plurality of other functions such as motion sensor-enabled capabilities, hand-gesture recognition and may include the capability to display images, such as logos, alphanumeric text, etc. Such controlling devices may cooperate with one or more apps, as shown in FIG. 3, to control a smart appliance. Furthermore, the controlling device 202, may cooperate with one or more smart appliances each comprising a computing client, such as in a client-server-model to provision and/or to control a smart appliance. In some examples, a microphone is coupled to one or more devices each located in a different room of the user's home and where the device having the microphone is coupled to the controlling device 202, via a local-area network or a wide-area network 216, for sending the voice commands to the controlling device 202.

While described as a microphone for receiving voice commands, it is to be understood that a microphone includes any transducer type device that converts sound into an electrical signal and may include one or more microphones in each device and each device may be coupled to each other, to the controlling device 202 and to a smart appliance.

While described as an active HDMI input, it is to be understood that an active input includes any active source/sink/port on the audio-video/communications bus status either wired or wirelessly connected to the smart appliance which initiated the status request.

It is also to be understood that a controlling device 202, may be partially configured at a factory with one or more device profiles preinstalled. When initially powered on, the controlling device 202, may be configured to automatically communicate with a predetermined smart appliance, such as STB 108, such as when the controlling device 202 and the STB 108 are paired with each other out of the-box. Similarly, an automatic pairing operation may be performed when the end user presses a first key, on the controlling device 202, for initiating a communication with said STB 108.

While various concepts have been described in detail, it will be appreciated by those skilled in the art that various modifications and alternatives to those concepts could be developed in light of the overall teachings of the disclosure. Further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents cited within this document are hereby incorporated by reference in their entirety.

What is claimed is:

1. A controlling device, comprising:
   a memory having processor-readable code embodied therein;
   a first communication interface;
   a microphone for receiving a voice input; and
   a processor, coupled to the memory, the first communication interface, and the microphone for executing the processor-readable code that causes the controlling device to perform steps comprising:
   receiving from a user, via the microphone, a voice data;
   using the voice data as received via the microphone to identify from amongst a plurality of smart appliances that are each associated with a respective one of a plurality of speech processing services a smart appliance to which the voice data as received via the microphone is to be transmitted; and
   transmitting, via the first communication interface, the voice data as received via the microphone to the identified smart appliance for subsequent interpretation by a one of the plurality of speech processing services associated with the identified smart appliance.

2. The controlling device as recited in claim 1, further comprising a second communication interface coupled to the processing device and wherein using the voice data as received via the microphone to identify from amongst the plurality of smart appliances that are each associated with a respective one of a plurality of speech processing services the smart appliance to which the voice data received via the microphone is to be transmitted comprises transmitting the voice data as received via the microphone to a server via the second communication interface and receiving from the remote server via the second communication interface an identity of the smart appliance to which the voice data as received via the microphone is to be transmitted.

3. The controlling device as recited in claim 1, wherein the voice data as received via the microphone is streamed to the identified smart appliance via use of the first communication interface.

4. The controlling device as recited in claim 1, wherein the voice data as received via the microphone is recorded in the memory prior to being transmitted to the identified smart appliance.

5. The controlling device as recited in claim 1, wherein the first communication interface comprises a radio frequency transmitter.

6. The controlling device as recited in claim 1, wherein the first communication interface comprises an infrared transmitter.

7. A method, comprising:
   receiving from a user, via a microphone of a controlling device, a voice data;
   using the voice data as received via the microphone to identify from amongst a plurality of smart appliances that are each associated with a respective one of a plurality of speech processing services a smart appliance to which the voice data received as via the microphone is to be transmitted;
   transmitting, via a first communication interface of the controlling device, the voice data as received via the microphone to the identified smart appliance;
   receiving, via a second communication interface of the identified smart appliance, the voice data as received via the microphone transmitted by the controlling device;
   transmitting, via a third communication interface of the identified smart appliance, the voice data as received via the microphone received from the controlling device to a one of the plurality of speech processing services associated with the identified smart appliance for determining a command to be executed by the identified smart appliance;
   receiving, via the third communication interface of the identified smart appliance, the command from the one of the plurality speech processing services; and
   executing by the identified smart appliance the command as received via the third communication interface of the identified smart appliance.

8. The method as recited in claim 7, wherein using the voice data as received via the microphone to identify from amongst the plurality of smart appliances that are each associated with a respective one of a plurality of speech processing services the smart appliance to which the voice data as received via the microphone is to be transmitted comprises transmitting, via a fourth communication interface of the controlling device, the voice data as received via the microphone and receiving, via the fourth communication interface of the controlling device, from the remote server an identity of the smart appliance to which the voice data received as via the microphone is to be transmitted.

9. The method as recited in claim 7, wherein the voice data as received via the microphone is streamed to the identified smart appliance via the use of the first communication interface.

10. The method as recited in claim 7, wherein the voice data as received via the microphone is recorded in a memory of the controlling device prior to being transmitted to the identified smart appliance.

11. The method as recited in claim 7, wherein using the voice data as received via the microphone to identify from amongst the plurality of smart appliances that are each associated with a respective one of a plurality of speech processing services the smart appliance to which the voice data as received via the microphone is to be transmitted comprises identifying a wake-word in the voice data as received via the microphone and using the identified wake-word to identify from amongst the plurality of smart appliances that are each associated with a respective one of a plurality of speech processing services the smart appliance to which the voice data as received via the microphone is to be transmitted.

12. The method as recited in claim 7, wherein the voice data as received via the microphone comprises a wake-word and a voice command.

13. A system, comprising:
a controlling device, comprising:
a first memory having first processor-readable code embodied therein;
a first communication interface;
a microphone for receiving a voice input; and
a first processor, coupled to the first memory, the first communication interface, and the microphone for executing the first processor-readable code that causes the controlling device to perform steps comprising:
receiving from a user, via the microphone, a voice data;
using the voice data as received via the micrphone to identify from amongst a plurality of smart appliances that are each associated with a respective one of a plurality of speech processing services a smart appliance to which the voice data received via the microphone is to be transmitted; and
transmitting, via the first communication interface, the voice data as received via the microphone to the identified smart appliance for subsequent interpretation by a one of the plurality of speech processing services associated with the identified smart appliance;
wherein the identified smart device comprises:
a second memory having second processor-readable code embodied therein;
a second communication interface;
a third communication interface; and
a second processor, coupled to the second memory, the second communication interface, and the third communication interface for executing the second processor-readable code that causes the identified smart appliance to perform steps comprising:

receiving, via the second communication interface, the voice data as received via the microphone transmitted from controlling device;
transmitting, via the third communication interface, the voice data as received via the microphone received from the controlling device to a one of the plurality of speech processing services associated with the identified smart appliance for determining a command to be executed by the identified smart appliance;
receiving, via the third communication interface, the command from the one of the plurality speech processing services; and
executing by the identified smart appliance the command as received via the third communication interface.

14. The system as recited in claim 13, wherein using the voice data as received via the microphone to identify from amongst the plurality of smart appliances that are each associated with a respective one of a plurality of speech processing services the smart appliance to which the voice data as received via the microphone is to be transmitted comprises transmitting, via a fourth communication interface of the controlling device, the voice data as received via the micrphone and receiving, via the fourth communication interface of the controlling device, from the remote server an identity of the smart appliance to which the voice data as received via the microphone is to be transmitted.

15. The system as recited in claim 13, wherein the voice data as received via the microphone is streamed to the identified smart appliance via the use of the first communication interface.

16. The system as recited in claim 13, wherein the voice data as received via the microphone is recorded in a memory of the controlling device prior to being transmitted to the identified smart appliance.

17. The system as recited in claim 13, wherein using the voice data as received via the microphone to identify from amongst the plurality of smart appliances that are each associated with a respective one of a plurality of speech processing services the smart appliance to which the voice data as received via the microphone is to be transmitted comprises identifying a wake-word in the voice data as received via the microphone and using the identified wake-word to identify from amongst the plurality of smart appliances that are each associated with a respective one of a plurality of speech processing services the smart appliance to which the voice data as received via the microphone is to be transmitted.

18. The system as recited in claim 13, wherein the voice data as received via the microphone comprises a wake-word and a voice command.

* * * * *